March 23, 1965 E. GASPAR ET AL 3,174,407
HYDRAULIC MOTORS
Original Filed Oct. 19, 1960 3 Sheets-Sheet 1

INVENTORS
E. Gaspar
M. H. Munne
P. F. Harrison
By Watson, Cole, Grindle & Watson
ATTORNEYS

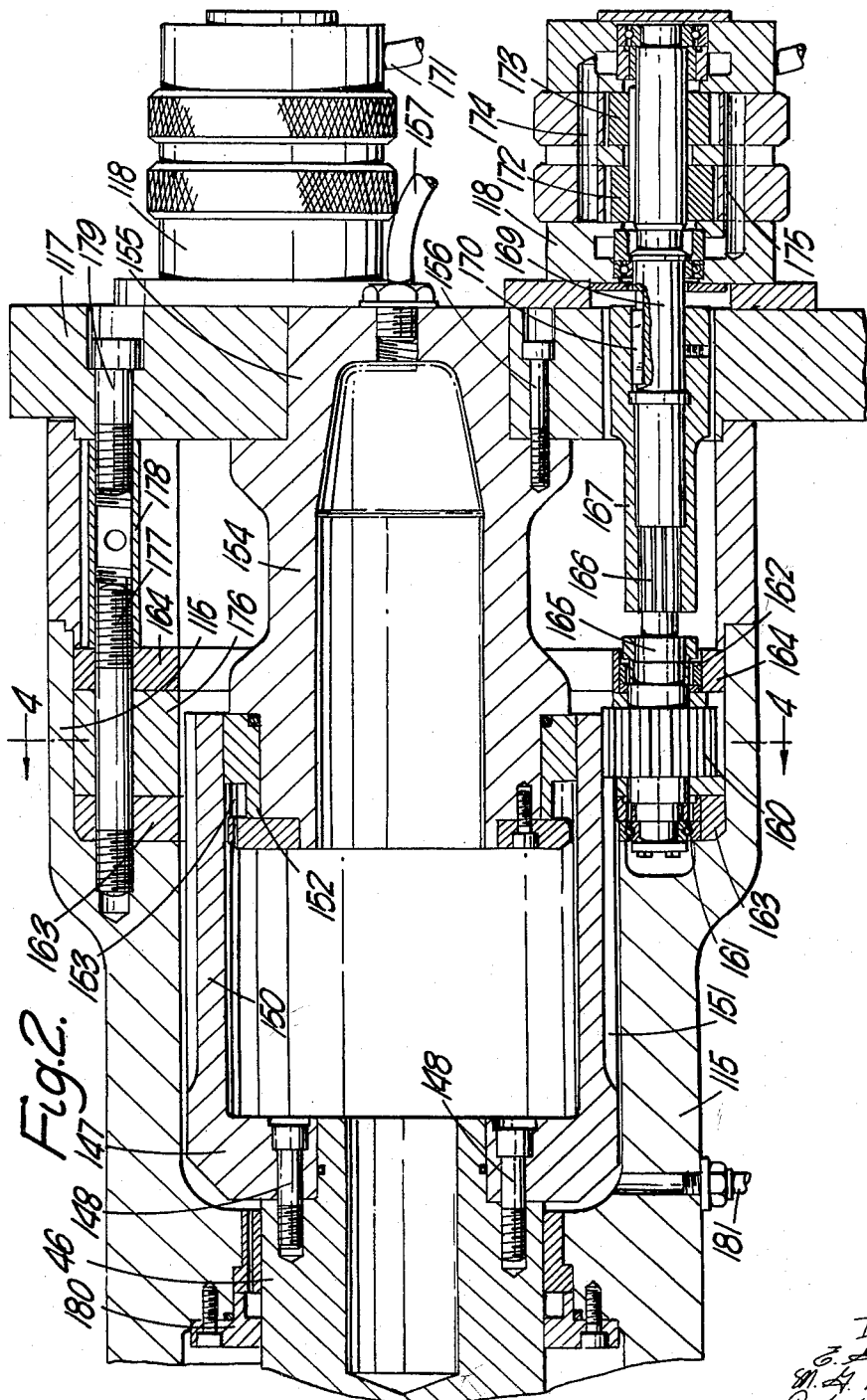

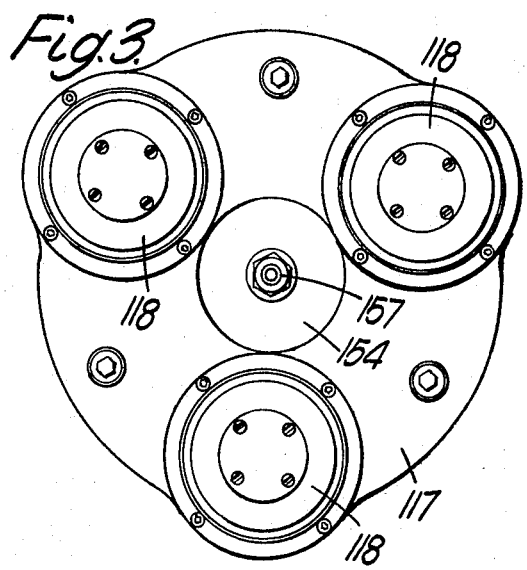
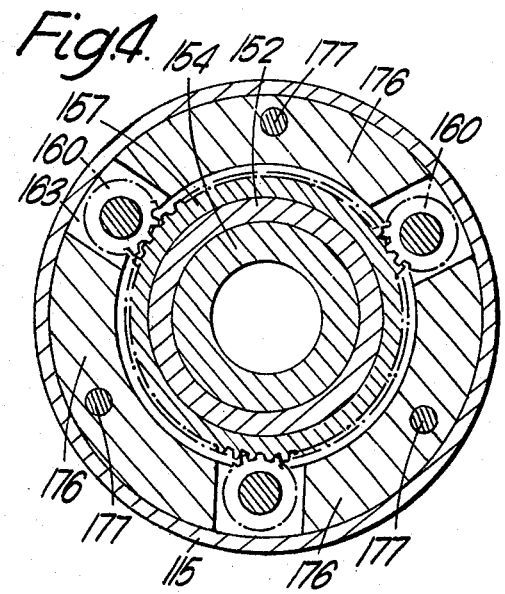

United States Patent Office 3,174,407
Patented Mar. 23, 1965

3,174,407
HYDRAULIC MOTORS
Emeric Gaspar, Michael George Munns, and Peter Franklin Harrison, London, England, assignors to The Projectile and Engineering Company Limited, London, England, a British company
Original application Oct. 19, 1960, Ser. No. 63,519, now Patent No. 3,068,521, dated Dec. 18, 1962. Divided and this application Sept. 18, 1962, Ser. No. 224,365
3 Claims. (Cl. 91—61)

This application is a divisional of our co-pending United States application Serial No. 63,519 filed October 19, 1960, for "Hydraulic Motors" issuing December 18, 1962, as Patent No. 3,068,521.

The invention relates to an hydraulic motor which is primarily intended to operate feed worm injection moulding machines but which can be used to operate extrusion machines or apparatus where the driven shaft must execute both rotational and longitudinal movements. It is one object of the invention to provide an hydraulic motor for an injection moulding machine which is capable of effecting rotary and also translational movement of the driven part. It is a further object of the invention to provide such a motor which will readily withstand the thrust of translational movement without interfering with rotational movement and in which both movements can be independently controlled.

In injection moulding and extrusion machines it is known to use a rotating worm in a heating chamber for the plastic material, to propel plastic material through the chamber and to compress it. It is also known in an injection moulding machine to inject the material so compressed into a mould by endwise movement of the parts. The injection force is very great, especially in the case of large moulds and may rise to hundreds of tons in a large machine. The problem of providing for a rotating part which also has to withstand very high thrust pressures and to transmit a very high torque for rotating the worm is a difficult one and the present invention provides a solution in which heavy thrust bearings are avoided.

The invention includes an hydraulic motor comprising in combination a motor element having a rotatable output member, a pinion driven by the output member, a gear-ring in mesh with the pinion, one of these two parts being axially movable and one of these two parts having teeth long enough to remain in mesh with the other when the axially movable member makes a full stroke, a piston-and-cylinder device of which one element is connected to the axially movable part to move axially and rotate therewith and whereof the other element is fixed, and means for connecting the element which moves with the axially movable part to a member which is to be both rotated and axially moved.

The invention will now be further described in conjunction with the accompanying drawings in which:

FIGURE 2 is a longitudinal section through the motor portion of the machine shown in FIGURE 1;

FIGURE 3 is an end view of the machine of FIGURE 1 looking from the right-hand end of the figure;

FIGURE 4 is a cross-section upon the line 4—4 of FIGURE 2, looking in the direction of the arrows;

Figure 1:
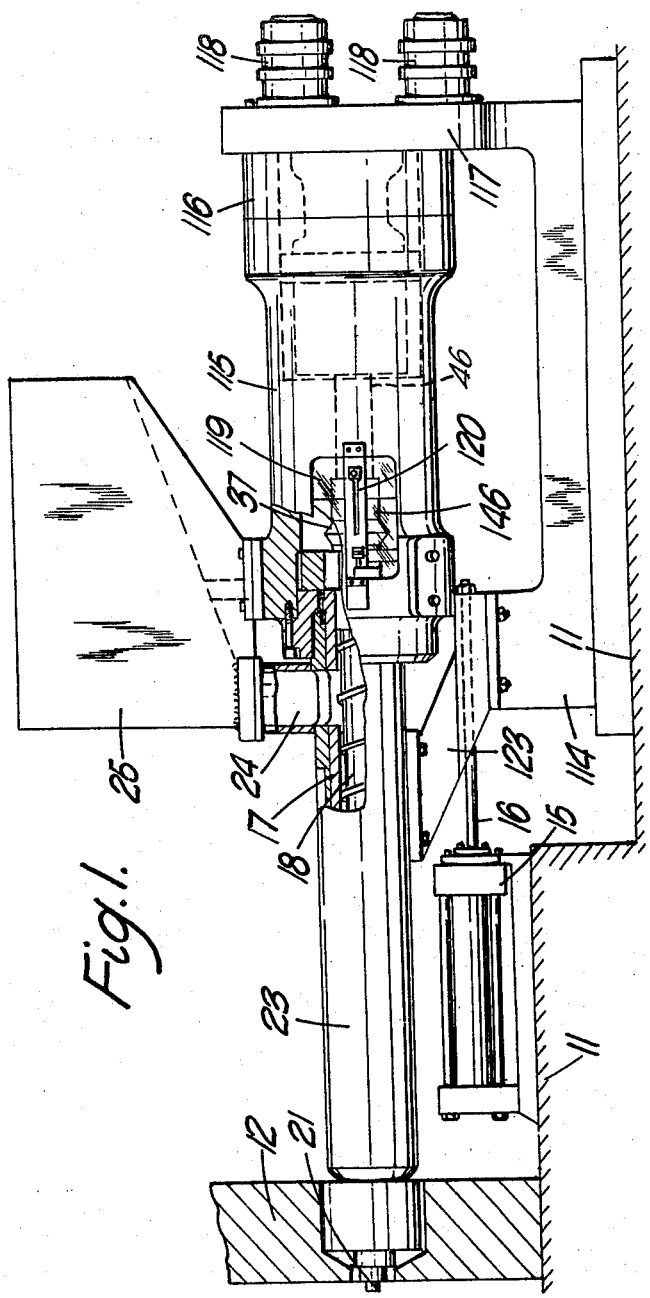
FIGURE 1 is a side elevation with parts broken away to show the interior of an injection moulding machine and hydraulic motor for operating the same.

Referring to FIGURES 1-4, the general arrangement of the parts is shown in FIGURE 1. The machine has a bed 11 on which is mounted a platen 12, within which is a nozzle 21 located at the end of a plasticizer casing 23. A plasticizing chamber 17 is enclosed in the casing 23, together with a worm 18 in the chamber which has to be rotated and also reciprocated endwise. The plasticising chamber 23 and associated parts are mounted on a slidable carriage 114 mounted on guideways on the frame 11 and operated by a ram 16 and jack cylinder 15. The movement of carriage 114 enables the nozzle 21 to be applied to or removed from a mould which can be clamped against platen 12 by means not shown. Above the feed worm which lies within the casing 23, there is mounted a hopper 25 and a feed throat 24 for feeding material which is to be plasticised and injected into a mould through nozzle 21.

Behind these parts there is an hydraulic motor comprising a casing 115, an end-plate 116, a connection 117 to the slide 114 and several external hydraulic driving-motor units 118. A window 119 in the side of the motor casing 115 permits a cam 37 to be seen and this co-operates with a limit-switch mounted on a fitting 120. These parts are described in the before-referred to application Serial No. 63,519 and will not need to be explained in detail in the present application, which relates to the motor shown in FIGURES 2-4 in detail.

Referring to FIGURE 2, the motor comprises a power-take-off shaft 46 to which is secured a cylinder head 147 by means of screws 148. The cylinder head has a trunk-like cylinder portion 150 on the outside of which are cut a series of long gear teeth 151. The interior of the cylinder is bored to receive a main piston head 152 provided with sealing means in a groove 153 and supported on a stout column 154, which has a reduced end portion 155 to enter the end-plate 117, in which it is secured by screws 156. A pressure connection 157 extends to the interior of the column 154 which is open to the interior of the cylinder 150 and thus the admission of pressure to the pipe 157 will cause the cylindrical gear member, together with the power output shaft 46, to move to the left as viewed in FIGURE 2. Three pinions 160 within the casing 115 mesh with the gear teeth 151 as shown in FIGURE 4. These pinions are supported in ball and roller bearings 161 and 162 carried in rings 163, 164 located on each side of the pinions 160. The pinion shafts 165, which pass through these bearings, extend toward the flange 117 and carry externally splined end-portions 166 which fit into internally splined sleeves 167 passing through apertures in the end-plate 117. Outside the end-plate there are mounted the hydraulic driving units 118 already referred to, which have driving-shafts 169 fitting into and keyed within the sleeve 167 by means of keys 170.

The hydraulic driving units 118 may be of any desired type and are supplied with hydraulic fluid through supply pipes 171. As shown, the driving units consist of two rotors 172, 173 which are supplied by a port 174 extending above them and are exhausted by a port 175 extending below them. From the port 175 the exhaust fluid is led away through a pipe, not shown.

The end-plate 117, casing 115, rings 163, 164 and spacers 176 are all drawn together by means of studs 177, intermediate screwed sleeves which fit on the studs, as shown at 178, and screws 179 passing through the end-plate 117. The sleeve 146 which surrounds the power-take-off shaft 46 carries the cam 37, shown in FIGURE 1, and this sleeve is surrounded close to the hollow trunk-shaped gear member 150 with a stuffing-box 180. There is a pressure supply connection 181 to the space between the head of the trunk-like member 150 and the stuffing-box 180.

In operation, the driving-motor units 118 drive the pinions 160 and rotate the trunk-like member 150, thus rotating the power-take-off shaft 46 and the sleeve 146 which is mounted upon it. The length of the gear teeth 151 permits retraction of the drive shaft 46 and the feed worm in the casing 23, while maintaining rotational movement. Such retraction may be effected by the rearward thrust of the feed worm in the casing 23, as it rotates.

Advance of the drive shaft 46 and its worm for the injection stroke is effected by admitting pressure through the column 154 to the space inside the cylindrical trunk member 150 and it will be noted that as the cylinder 150 is rotating, no thrust bearing is required. The reaction of the thrust is taken by the piston 152 and column 154. Retraction apart from that effected by rotation of the feed worm, can be effected, if desired, by admitting pressure through the pipe 181. Pressure, if required, behind the worm during retraction by its rotations can be obtained by admitting fluid to the interior of the member 150 and retraction due to the feed worm can therefore be governed by moderating this pressure.

These hydraulic motors are conveniently used with hydraulic pressures of the order of 1000 p.s.i. By forming the gear teeth 151 on the external periphery of the extension 150 a satisfactory tooth shape can be easily obtained. Furthermore the shape of the pinion teeth can be easily generated and thus the construction described is easily manufactured.

We have found that either gear-motors or vane motors can be used for the driving units 118, to drive the pinions 160.

We claim:

1. An hydraulic motor comprising in combination a motor element having a rotatable output member, a pinion driven by the output member, an axially movable gear-ring in mesh with the pinion, said gear-ring being hollow and having external teeth long enough to remain in mesh with the pinion when the gear-ring moves axially with a full stroke, a piston-and-cylinder drive of which said cylinder is said axially movable hollow gear-ring and said piston is fixed, and means for connecting the gear-ring to a member which is to be rotated and axially moved.

2. An hydraulic motor as claimed in claim 1 wherein the piston contains passages for the supply of hydraulic fluid to the interior of said cylinder.

3. An hydraulic motor as claimed in claim 1 wherein a plurality of motor elements are provided all connected to pinions in mesh with the gear-ring at points distributed around its periphery.

References Cited by the Examiner
UNITED STATES PATENTS

| | | | |
|---|---|---|---|
| 1,214,542 | 2/17 | Haeseler | 91—61 |
| 1,999,248 | 4/35 | Melling | 60—52 |
| 2,036,162 | 3/36 | Svenson | 60—52 X |
| 2,160,217 | 5/39 | Kingsbury | 60—52 |
| 2,374,774 | 5/45 | Olsen | 60—52 |
| 2,688,313 | 9/54 | Bauer | 60—35.6 |

JULIUS E. WEST, *Primary Examiner.*

EDGAR W. GEOGHEGAN, *Examiner.*